US010725690B2

(12) United States Patent
Radtke et al.

(10) Patent No.: US 10,725,690 B2
(45) Date of Patent: Jul. 28, 2020

(54) NON-VOLATILE MEMORY CLONING WITH HARDWARE COPY-ON-WRITE SUPPORT

(71) Applicant: Intel Corporation, Santa Clara, CA (US)

(72) Inventors: Jakub Radtke, Gdansk (PL); Wojciech Malikowski, Gdansk (PL); Tobiasz Domagala, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 78 days.

(21) Appl. No.: 15/984,138

(22) Filed: May 18, 2018

(65) Prior Publication Data
US 2019/0042097 A1    Feb. 7, 2019

(51) Int. Cl.
*G06F 3/06* (2006.01)
*G06F 12/1009* (2016.01)

(52) U.S. Cl.
CPC ............ *G06F 3/065* (2013.01); *G06F 3/0604* (2013.01); *G06F 3/064* (2013.01); *G06F 3/0616* (2013.01); *G06F 3/0679* (2013.01); *G06F 12/1009* (2013.01); *G06F 2212/1008* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 9,542,118 B1* | 1/2017 | Lercari | G06F 3/064 |
| 2010/0077136 A1* | 3/2010 | Ware | G06F 12/0246 |
| | | | 711/103 |
| 2012/0047312 A1* | 2/2012 | Nathuji | G06F 9/3832 |
| | | | 711/6 |
| 2013/0227236 A1* | 8/2013 | Flynn | G11C 16/26 |
| | | | 711/165 |
| 2013/0339572 A1* | 12/2013 | Fanning | G06F 12/1009 |
| | | | 711/102 |
| 2014/0006734 A1* | 1/2014 | Li | G06F 9/45558 |
| | | | 711/162 |
| 2014/0013045 A1* | 1/2014 | Crossland | G06F 12/0866 |
| | | | 711/105 |
| 2014/0281149 A1* | 9/2014 | Roberts | G06F 12/023 |
| | | | 711/103 |
| 2016/0203053 A1* | 7/2016 | Talagala | H04L 67/1097 |
| | | | 714/6.12 |
| 2019/0018785 A1* | 1/2019 | Beard | G06F 12/0802 |
| 2019/0018790 A1* | 1/2019 | Beard | G06F 12/1036 |
| 2019/0018794 A1* | 1/2019 | Beard | G06F 12/1063 |

\* cited by examiner

*Primary Examiner* — William E. Baughman

(74) *Attorney, Agent, or Firm* — Compass IP Law, PC

(57) ABSTRACT

Examples may include a non-volatile memory having a memory including a first table of device physical addresses and a second table of physical device addresses; a control register to receive a clone command to clone a second memory region of the memory as a copy of a first memory region of the memory, the first and second memory regions being referenced by different device physical addresses; and address translation logic, upon receipt of the clone command, create a first entry in the first table for each page of the first memory region and create a second entry in the first table for each page of the second memory region, each first table entry for the first memory region and each first table entry for the second memory region pointing to a same entry in the second table.

17 Claims, 7 Drawing Sheets

NON-VOLATILE MEMORY CLONING WITH HARDWARE COPY-ON-WRITE SUPPORT

TECHNICAL FIELD

Examples described herein are generally related to copying data in a memory of a computing system.

BACKGROUND

In some situations, data is copied multiple times within a memory. One approach to making copies of data within a memory is to use repeated operating system (OS) commands to write the same data over and over, to new locations in memory each time. This is inefficient because it involves many read/write operations, the entire copied area of memory has to be read and then written to a new memory area, and the reading and writing is executed in blocks. Further, this requires heavy use of the memory media, and this may impair the endurance (e.g., lifespan) of the memory since some memory technologies provide for limited numbers of write operations before possible memory failures.

Another approach is to use a file system that implements a copy-on-write (CoW) paradigm. Copy-on-write, sometimes referred to as implicit sharing or shadowing, is a resource-management technique used in computer programming to efficiently implement a "duplicate" or "copy" operation on modifiable resources. If a resource is duplicated but not modified, it is not necessary to create a new resource; the resource can be shared between the copy and the original. Modifications must still create a copy, hence the technique: the copy operation is deferred to the first write. By sharing resources in this way, it is possible to significantly reduce the resource consumption of unmodified copies, while adding a small overhead to resource-modifying operations. However, using a file system which implements a CoW paradigm has disadvantages. This approach limits a user of a computing system to a particular file system. It requires additional metadata to be stored on the memory media, it's efficiency depends strongly on a proper hardware configuration and is not transparent to the user.

DETAILED DESCRIPTION

As contemplated in the present disclosure, a non-volatile memory (NVM) may be designed with a clone command functionality to implement a CoW paradigm within the NVM. This allows a computer program such as an application program, an OS, or other system software to request to efficiently create copies of data within the NVM. Embodiments of the present invention accelerate the process of memory range cloning, enable the implementation of CoW without using OS mechanisms (such as interrupts), and increase the endurance of the NVM (by requiring fewer write operations and less metadata).

Figure 1:
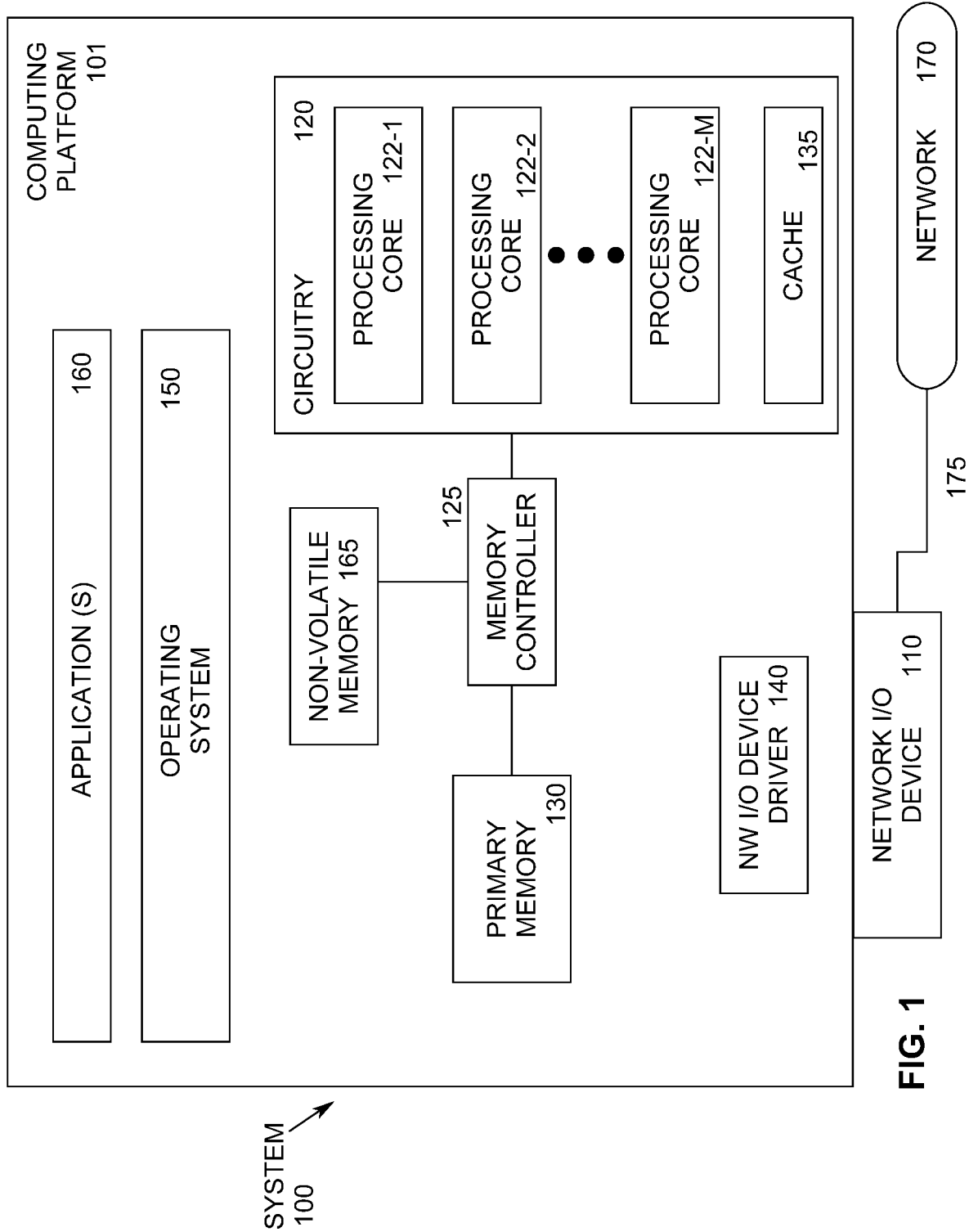
FIG. 1 illustrates an example computing system.

FIG. 1 illustrates an example computing system 100. As shown in FIG. 1, computing system 100 includes a computing platform 101 coupled to a network 170. In some examples, as shown in FIG. 1, computing platform 101 may couple to network 170 via a network communication channel 175 and through a network I/O device 110 (e.g., a network interface controller (NIC)) having one or more ports connected or coupled to network communication channel 175.

According to some examples, computing platform 101, as shown in FIG. 1, may include circuitry 120, primary memory 130 (which may be volatile), non-volatile memory (NVM) 165, memory controller 125, a network (NW) I/O device driver 140, an operating system (OS) 150, one or more application(s) 160. In some examples, as shown in FIG. 1, circuitry 120 may communicatively couple to primary memory 130 and NVM 165 via memory controller 125. In other examples, memory controller 125 may be integral with processor circuitry 120. Although not shown in FIG. 1, in some examples, operating system 150, NW I/O device driver 140 or application(s) 160 may be implemented, at least in part, via cooperation between one or more memory devices included in primary memory 130 (e.g., volatile or NVM devices), NVM 165 and elements of circuitry 120 such as processing cores 122-1 to 122-$m$, where "m" is any positive whole integer greater than 2.

In some examples, computing platform 101, may include, but is not limited to, a server, a server array or server farm, a web server, a network server, an Internet server, a work station, a mini-computer, a main frame computer, a super-computer, a network appliance, a web appliance, a distributed computing system, multiprocessor systems, processor-based systems, or a combination thereof. Also, circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors; and similar processors. Circuitry 120 may include at least one cache 135 to store data.

According to some examples, primary memory 130 and/or NVM 165 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory" (such as 3D XPoint™ commercially available from Intel Corporation). Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In one example, primary memory 130 may be a volatile memory and persistent memory 165 may be a NVM.

Figure 2:
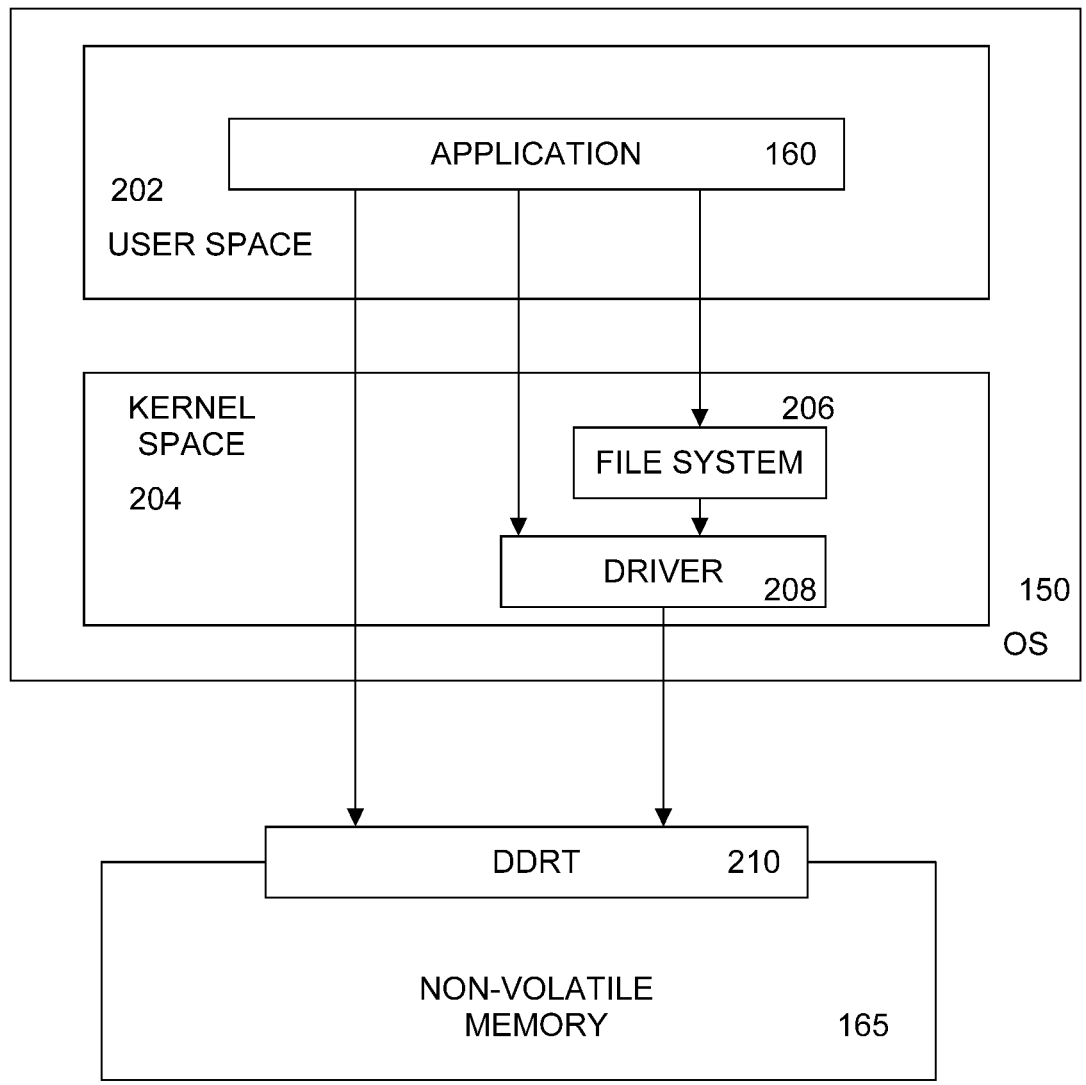
FIG. 2 illustrates an example of an OS interacting with a non-volatile memory.

FIG. 2 illustrates an example of an OS 150 interacting with a NVM 165 according to an embodiment of the present invention. NVM 165 comprises a double data rate transfer (DDRT) logic component for communication of commands and data with other system components. An application 160 may be executed by one or more processing cores of circuitry 120 on computing platform 101 in user space 202. Parts of the OS, such as file system 206 and driver 208 may be executed by one or more processing cores of circuitry 120 on computing platform 101 in kernel space 204. Driver 208 comprises code for providing NVM input/output (I/O) capabilities by interfacing with DDRT 210 of NVM 165. Application 160 may communicate directly with DDRT 210 of NVM 165. Application 160 may also communicate with NVM 165 via file system 206 and driver 208, and then DDRT 210. Application 160, file system 206, and driver 208 may all be capable of sending commands and data to NVM 165, and of receiving status indicators and data from NVM 165.

Figure 3:
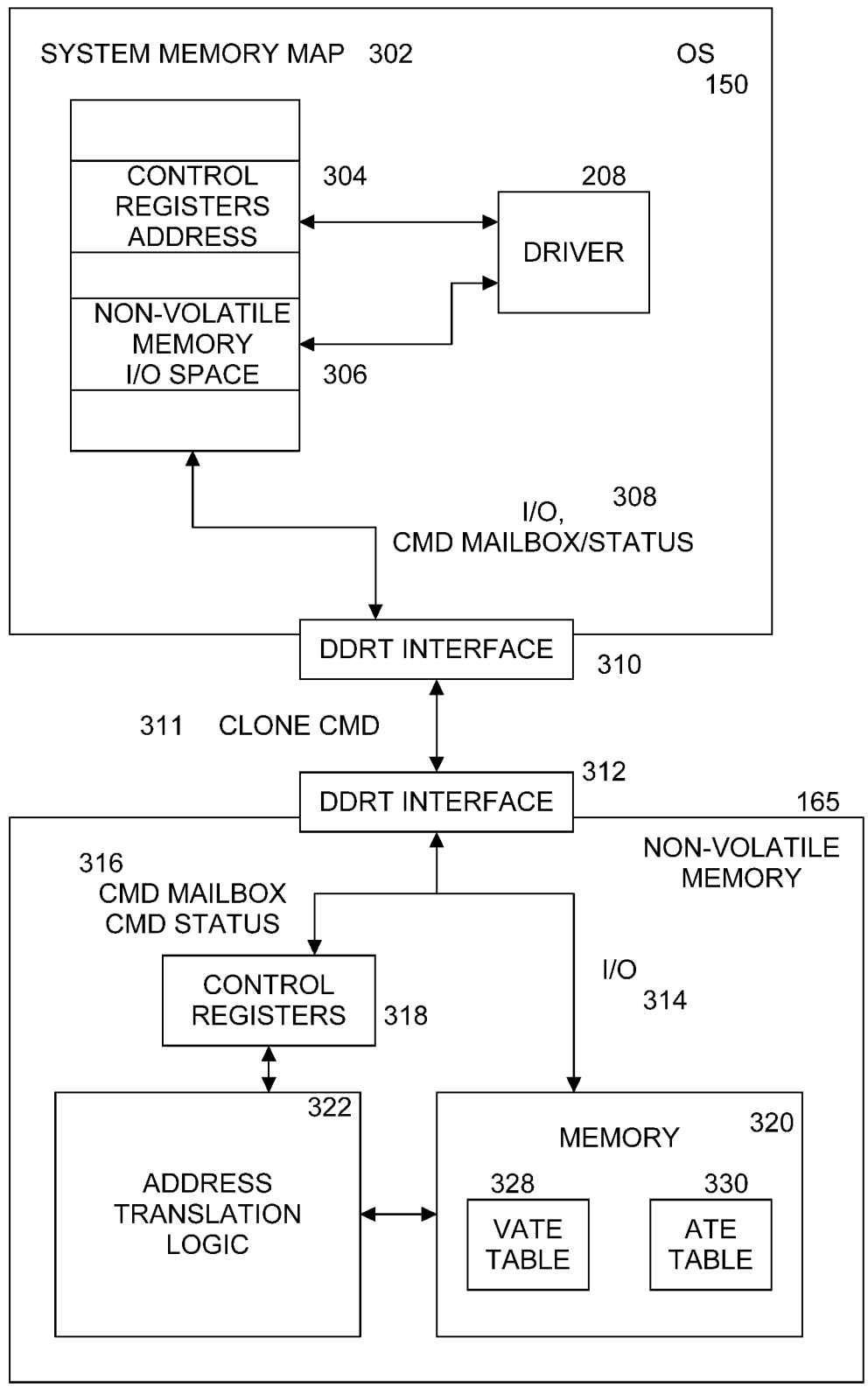
FIG. 3 illustrates an example of OS and non-volatile memory components.

FIG. 3 illustrates an example of OS and non-volatile memory components according to an embodiment of the present invention. Driver 208 may send commands 308 to the NVM over DDRT interfaces 310 and 312. Commands (CMDs) may include I/O requests to write data to the NVM, to read data from the NVM, and at least one other command as described below. Responses to commands may include a status of the implementation of the command by NVM 165. I/O commands may result in data being written to memory 320 of NVM 165 or read from memory 320 over line 314. In an embodiment, control registers 318 in NVM 165 operate as a command mailbox 316 storing received commands and resulting status. Driver 208 may access control registers address 304 in system memory map 302 in order to know the location of the control registers 318 in the NVM 165. Driver 208 may manage non-volatile memory I/O space 306 of system memory map 302 to store data to be written to the NVM or read from the NVM.

When an I/O command is received by NVM 165, address translation logic 322 of NVM 165 receives a device physical address (DPA) in the address range of NVM I/O space 306. To write data to an address of memory 320 or read data from an address in memory 320, the DPA sent by driver 208 of OS 150 must be translated into a physical device address (PDA) in the I/O space of memory 320. Address translation logic 322 translates a received DPA into a PDA addressing a location in memory 320 using an ATE table 330. The PDA may then be used to access the desired location in memory 320.

According to embodiments of the present invention, a new Clone command 311 may be provided by the NVM. The Clone command 311 provides the capability to implement a byte addressable (not block addressable) CoW functionality on the NVM while minimizing the steps taken by the OS to cause copying of data in the NVM. An example of a Clone command is as follows:

Clone (start_source_DPA, length, start_target_PDA)

According to an embodiment, to implement the Clone command, memory 320 includes a VATE table 328. During implementation of a Clone command, address translation logic 322 translates a received DPA into a PDA addressing a location in memory 320 using VATE table 328 and ATE table 330. In an embodiment, VATE table 328 is hidden from driver 208 and OS 150 and is only accessible internal to the NVM by address translation logic 322. If memory is being cloned, the PDA may be translated using VATE table 328 and ATE table 330. If memory is not being cloned, the PDA may be translated using only ATE table 330. Each VATE table 328 entry may store a DPA and a pointer to an ATE table entry storing a PDA.

Figure 4:
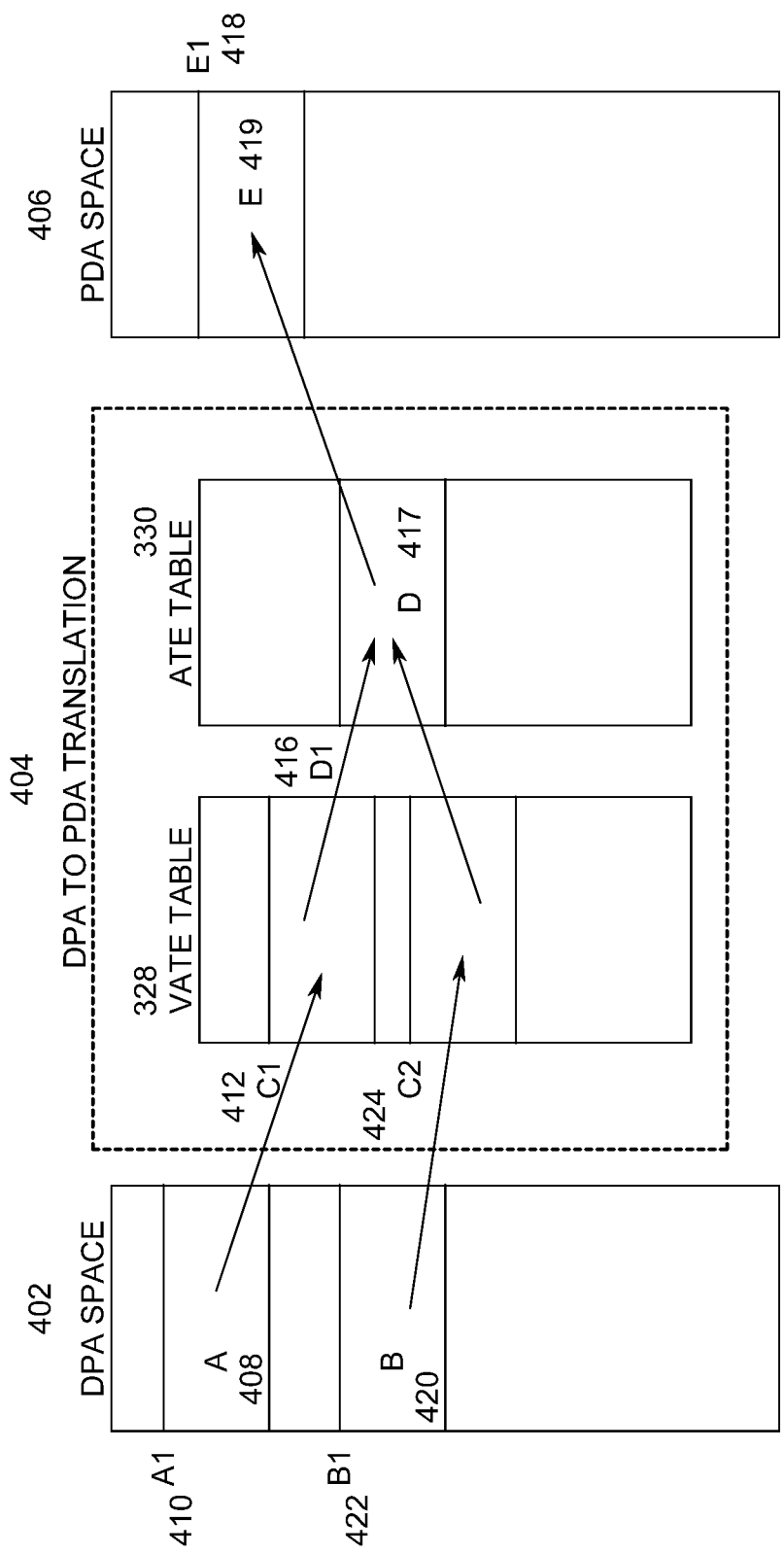
FIG. 4 illustrates a first example of device physical address (DPA) to physical device address (PDA) translation for a Clone command.

FIG. 4 illustrates a first example of DPA to PDA translation for a Clone command according to an embodiment. An address space for DPAs known by the OS is shown as DPA space 402. An address space for PDAs known internal to the NVM is shown as PDA space 406.

In an embodiment, implementing a Clone command results in address translation logic 322 performing DPA to PDA translation 404. Consider a first memory region A 408 of memory 320 that begins at DPA A1 410. For I/O commands, address translation logic 322 maps DPAs (known by the OS) into internal (not exposed to the OS) PDAs. In some instances, software on computing platform 101 (such as application 160, OS 150 or other software) desires to clone a region of memory, such as cloning A 408 as a second region of memory B 420. After the NVM receives the Clone command from driver 208, address translation logic 322 adds new entries C1 412 and C2 424 to VATE table 328. Each of the new entries C1 412 and C2 424 point to the same PDAs D 417 starting at D1 416 in ATE table 330, thus indicating that both first memory region A 408 and second memory region B 420 should use the same PDAs for each memory region. The common entry D 417 in ATE table 330 stores PDAs E 419 starting at E1 418. In an embodiment, a selected bit in each VATE table 328 entry may indicate if the memory referenced by the entry is cloned. Once the mapping is done for memory regions A and B, these memory regions may be used by software such as application 160 and OS 150, with future I/O commands referencing DPAs to these memory regions being translated to access the same PDAs in memory 320. Note that after the Clone command is implemented there will be multiple entries in the VATE table 328 for each byte addressable memory cell specified by the Clone command, and the now non-empty VATE table is used to translate DPAs for subsequent I/O commands.

Figure 5:
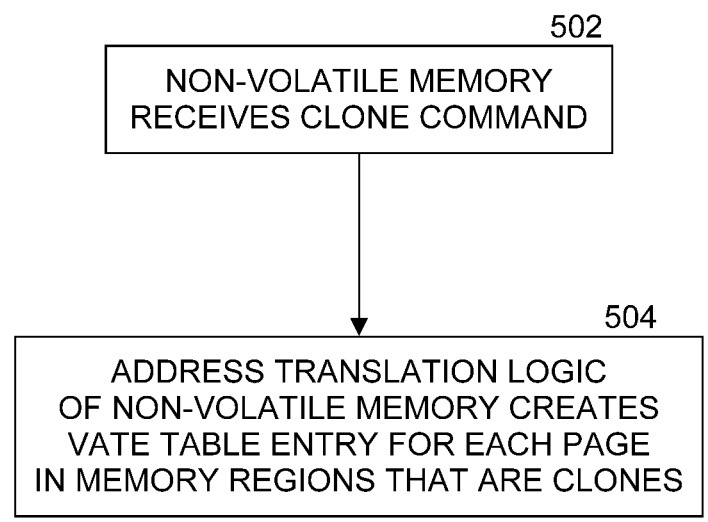
FIG. 5 illustrates an example of a logic flow for initializing VATE table entries during implementation of a Clone command.

FIG. 5 illustrates an example of a logic flow 500 for initializing VATE table entries during implementation of a Clone command. At block 502, NVM 165 receives a Clone command 311 from at least one of application 160, driver 208, OS 150, or file system 206. At block 504, address translation logic 322 of NVM 165 creates a VATE table entry for each page in the memory regions that are clones of each other. For example, address translation logic 322 creates a VATE table entry for each page of memory region A and for each page of memory region B.

After a memory region is cloned, subsequent read commands received by the NVM from the driver to access either the first memory region or the second (cloned) memory region results in address translation logic 322 translating the received DPA in either the first memory region or the second memory region into the associated (same) PDA using the VATE table and the ATE table.

Figure 6:
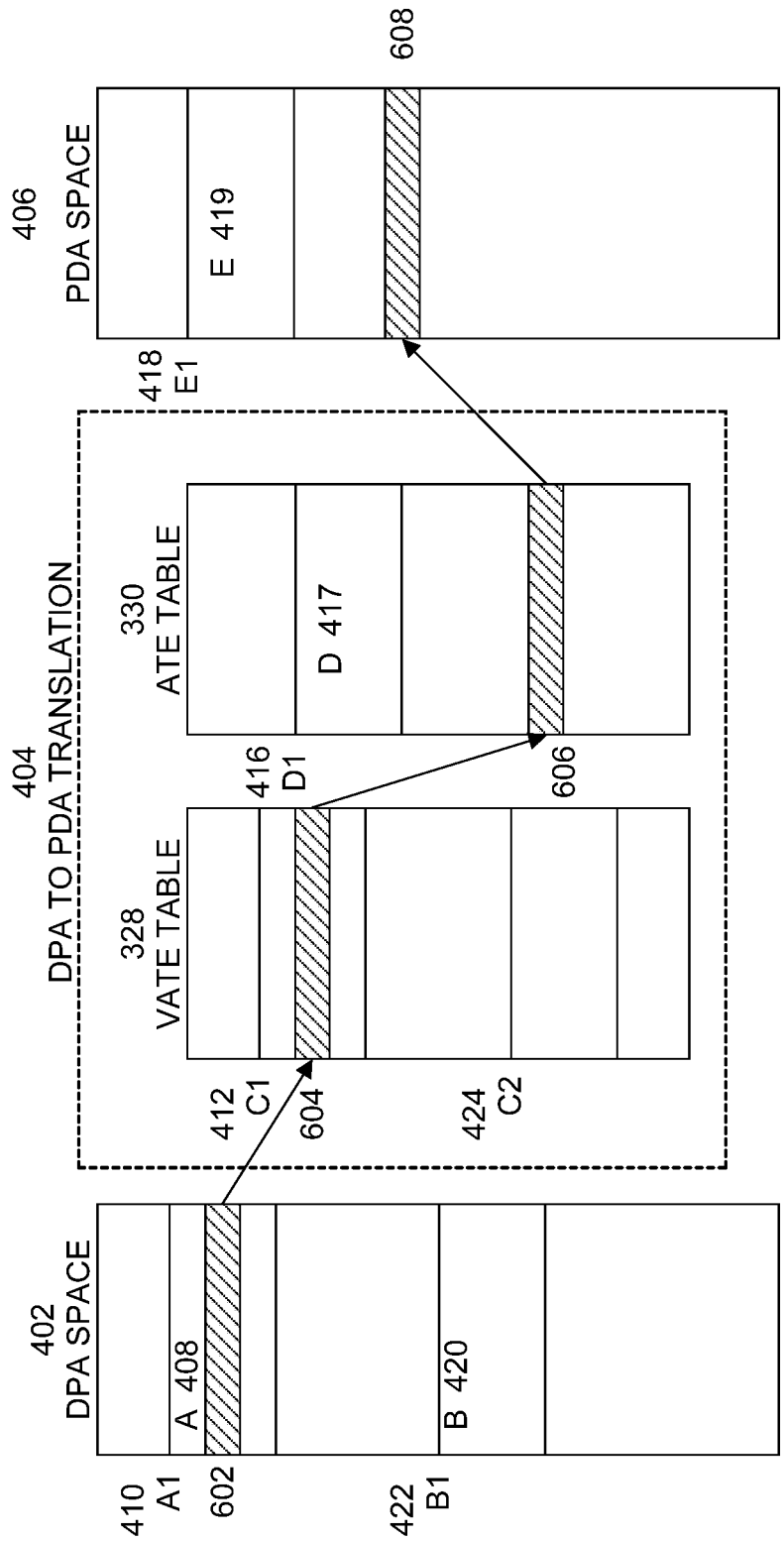
FIG. 6 illustrates a second example of DPA to PDA translation.

FIG. 6 illustrates a second example of DPA to PDA translation. Assume that the OS via driver 208 sends a write command to the NVM to write at DPA 602 of memory region A 408 starting at A1 410 (which was previously cloned as memory region B 420 starting at B1 422). Address translation logic 322 knows via VATE table 328 that the memory cells for memory region fragment starting at DPA 602 are shared/cloned so address translation logic 322 performs a remapping operation. Address translation logic updates VATE Table 328 at entry C1 412 to reflect that the memory starting at DPA 602 has been changed. DPA 604 now points to corresponding PDA 606 of ATE table 330 that is not shared with memory region B. This results in PDA 608. Thus, A and B are no longer the same due to the writing of memory starting at DPA 602.

Figure 7:
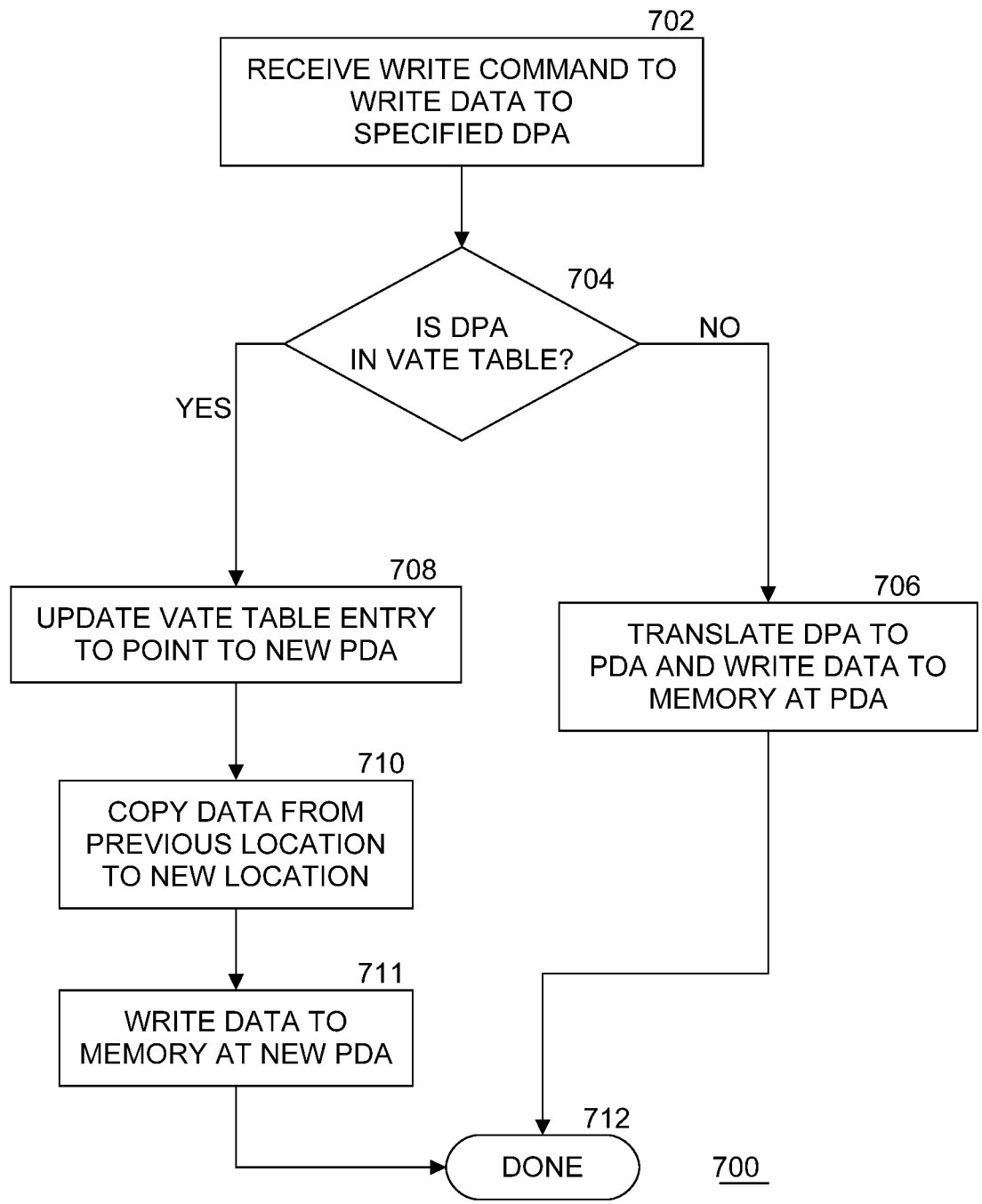
FIG. 7 illustrates an example of a logic flow for updating VATE table entries.

FIG. 7 illustrates an example of a logic flow 700 for updating VATE table entries in response to receiving a write command to a cloned memory region. At block 702, NVM 165 receives a write command to write data to a portion of a cloned memory region starting at a specified DPA. Address translation logic 322 checks if the specified DPA is in VATE table 328 (indicating that the memory region starting at the DPA was previously cloned). If the specified DPA is not in VATE table 328, then processing continues with block 706, where address translation logic 322 translates the DPA into a corresponding PDA and writes the data to memory 320 at the PDA. Processing is done at block 712. In an embodiment, a status may be returned to the caller.

If the specified DPA is in the VATE table at block 704, then processing continues with block 708, where the VATE table entry for the specified DPA may be updated to point to a new PDA. At block 710, data may be copied from the memory addressed by the old PDA to the memory addressed by the new PDA. In an embodiment, at least a portion, specified by a size or length parameter, of the cloned memory region may be copied. At block 711, the data from the write command may be written to the memory at the new PDA. Processing ends at block 712.

Various components of computing platform 101 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

It should be appreciated that the exemplary computing platforms shown in the Figures may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   a non-volatile memory device including
      a byte addressable three-dimensional cross point memory including a virtual address translation table of device physical addresses and an address translation table of physical device addresses;
      at least one control register to receive a clone command over an interface from an operating system to clone a second memory region of the memory as a copy of a first memory region of the byte addressable three-dimensional cross point memory, the first and second memory regions being referenced by different device physical addresses; and
      address translation circuitry, coupled to the at least one control register and the memory, including logic to, upon receipt of the clone command, create a first entry in the virtual address translation table for each page of the first memory region and create a second entry in the virtual address translation table for each page of the second memory region, each virtual address translation table entry for the first memory region and each virtual address translation table entry for the second memory region pointing to a same entry in the address translation table.

2. The apparatus of claim 1, the at least one control register to receive a read command to read data from the first memory region starting at a specified device physical address, and the address translation circuitry including logic to, upon receipt of the read command:
   translate the specified device physical address into a physical device address using the first entry in virtual address translation table and the same entry in the address translation table.

3. The apparatus of claim 1, the at least one control register to receive a read command to read data from the second memory region starting at a specified device physical address, and the address translation circuitry including logic to, upon receipt of the read command:
   translate the specified device physical address into a physical device address using the second entry in virtual address translation table and the same entry in the address translation table.

4. The apparatus of claim 1, the at least one control register to receive a write command to write data to the first memory region at a specified device physical address, and the address translation circuitry including logic to, upon receipt of the write command:
   determine if there is an entry in the virtual address translation table for the specified device physical address; and
   translate the specified device physical address to a corresponding physical device address and write the data to the byte addressable three-dimensional cross point memory at the corresponding physical device address when the entry is not in the virtual address translation table.

5. The apparatus of claim 4, the address translation circuitry including logic to, when the entry is in the virtual address translation table,
   update the entry in the virtual address translation table to point to a new physical device address in the byte addressable three-dimensional cross point memory;
   copy at least a portion of the first memory region to the byte addressable three-dimensional cross point memory starting at the new physical device address; and
   write the data of the portion of the first memory region to the byte addressable three-dimensional cross point memory at the corresponding physical device address.

6. The apparatus of claim 1, wherein device physical addresses comprise virtual addresses.

7. The apparatus of claim 6, wherein the virtual address translation engine table is hidden from an operating system.

8. A method comprising:
   receiving a clone command by a non-volatile memory device over an interface from an operating system to clone a second memory region of a byte addressable three-dimensional cross point memory as a copy of a first memory region of the byte addressable three-dimensional cross point memory, the first and second memory regions being referenced by different device physical addresses, the non-volatile memory device including a virtual address translation table of device physical addresses and an address translation table of physical device addresses; and
   creating a first entry in the virtual address translation table for each page of the first memory region and create a second entry in the virtual address translation table for each page of the second memory region, each virtual address translation table entry for the first memory region and each virtual address translation table entry for the second memory region pointing to a same entry in the address translation table.

9. The method of claim 8, comprising
receiving a read command to read data from the first memory region starting at a specified device physical address; and
translating the specified device physical address into a physical device address using the first entry in virtual address translation table and the same entry in the address translation table.

10. The method of claim 8, comprising:
receiving a read command to read data from the second memory region starting at a specified device physical address; and
translating the specified device physical address into a physical device address using the second entry in virtual address translation table and the same entry in the address translation table.

11. The method of claim 8, comprising:
receiving a write command to write data to the first memory region at a specified device physical address;
determining if there is an entry in the virtual address translation table for the specified device physical address; and
translating the specified device physical address to a corresponding physical device address and write the data to the memory at the corresponding physical device address when the entry is not in the virtual address translation table.

12. The method of claim 11, comprising when the entry is in the virtual address translation table,
updating the entry in the virtual address translation table to point to a new physical device address in the byte addressable three-dimensional cross point memory;
copying at least a portion of the first memory region to the byte addressable three-dimensional cross point memory starting at the new physical device address; and
writing the data of the portion of the first memory region to the byte addressable three-dimensional cross point memory at the corresponding physical device address.

13. A system comprising:
a processor to send a clone command over an interface to clone a second memory region of a memory as a copy of a first memory region of the memory, the first and second memory regions being referenced by different device physical addresses; and
a non-volatile memory device coupled to the processor over the interface comprising
a byte addressable three-dimensional memory storing a virtual address translation table of device physical addresses and a address translation table of physical device addresses; and
address translation circuitry, coupled to the byte addressable three-dimensional cross point memory, including logic to, upon receipt of the clone command over the interface from the processor, create a first entry in the virtual address translation table for each page of the first memory region and create a second entry in the virtual address translation table for each page of the second memory region, each virtual address translation table entry for the first memory region and each virtual address translation table entry for the second memory region pointing to a same entry in the address translation table.

14. The system of claim 13, the non-volatile memory device adapted to receive a read command to read data from the first memory region starting at a specified device physical address, and the address translation circuitry including logic to, upon receipt of the read command:
translate the specified device physical address into a physical device address using the first entry in virtual address translation table and the same entry in the address translation table.

15. The system of claim 13, the non-volatile memory device to receive a read command to read data from the second memory region starting at a specified device physical address, and the address translation circuitry including logic to, upon receipt of the read command:
translate the specified device physical address into a physical device address using the second entry in virtual address translation table and the same entry in the address translation table.

16. The system of claim 13, the at least one control register to receive a write command to write data to the first memory region at a specified device physical address, and the address translation circuitry including logic to, upon receipt of the write command:
determine if there is an entry in the virtual address translation table for the specified device physical address;
translate the specified device physical address to a corresponding physical device address and write the data to the byte addressable three-dimensional cross point memory at the corresponding physical device address when the entry is not in the virtual address translation table.

17. The system of claim 16, the address translation circuitry including logic to, when the entry is in the virtual address translation table,
update the entry in the virtual address translation table to point to a new physical device address in the byte addressable three-dimensional cross point memory;
copy at least a portion of the first memory region to the byte addressable three-dimensional cross point memory starting at the new physical device address; and
write the data of the portion of the first memory region to the byte addressable three-dimensional cross point memory at the corresponding physical device address.

\* \* \* \* \*